(12) United States Patent
Shimura

(10) Patent No.: US 7,630,037 B2
(45) Date of Patent: Dec. 8, 2009

(54) DOUBLE-SIDED BACKLIGHT UNIT WITH DIFFERENT AREA FIRST AND SECOND LCD PANELS AND HAVING A FIRST LIGHT-DIFFUSING SHEET BETWEEN A LIGHT GUIDE PLATE AND LIGHT-ABSORBING SHEET AND SECOND LIGHT-DIFFUSING SHEET BETWEEN THE LIGHT GUIDE PLATE AND THE SECOND LCD PANEL

(75) Inventor: Takashi Shimura, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 616 days.

(21) Appl. No.: 11/435,531

(22) Filed: May 17, 2006

(65) Prior Publication Data

US 2006/0262565 A1 Nov. 23, 2006

(30) Foreign Application Priority Data

May 20, 2005 (JP) ............................. 2005-148822

(51) Int. Cl.
*G02F 1/1335* (2006.01)
(52) U.S. Cl. ........................... 349/115; 349/62; 349/64; 349/74
(58) Field of Classification Search ................ 349/115, 349/62, 64, 74
See application file for complete search history.

(56) References Cited

U.S. PATENT DOCUMENTS

| 6,831,711 B2* | 12/2004 | Choi et al. .................... 349/74 |
| 6,897,914 B2* | 5/2005 | Yoshida ........................ 349/65 |
| 7,301,591 B2* | 11/2007 | Akiyama ...................... 349/96 |
| 2005/0030727 A1 | 2/2005 | Shimura |
| 2005/0041179 A1* | 2/2005 | Suzuki ......................... 349/74 |

FOREIGN PATENT DOCUMENTS

JP 2002-189230 A2 7/2002

* cited by examiner

*Primary Examiner*—John Heyman
(74) *Attorney, Agent, or Firm*—Brinks Hofer Gilson & Lione

(57) ABSTRACT

A single light guide plate illuminates both first and second liquid crystal display panels opposed to each other, the second liquid crystal display panel having a larger display area than that of the first liquid crystal display panel. A light-absorbing sheet is provided between the light guide plate and the first liquid crystal display panel to absorb light from the light guide plate and has a light-transmitting part aligned with the first liquid crystal display panel in a direction from the light guide plate toward the first liquid crystal display panel to transmit light from the light guide plate to the first liquid crystal display panel. A reflective polarizing sheet is provided between the second liquid crystal display panel and the light guide plate. The light-absorbing sheet eliminates brightness unevenness on the second liquid crystal display panel, which would otherwise occur due to the influence of the first liquid crystal display panel, and the reflective polarizing sheet allows effective utilization of light from the light guide plate.

13 Claims, 6 Drawing Sheets

DOUBLE-SIDED BACKLIGHT UNIT WITH DIFFERENT AREA FIRST AND SECOND LCD PANELS AND HAVING A FIRST LIGHT-DIFFUSING SHEET BETWEEN A LIGHT GUIDE PLATE AND LIGHT-ABSORBING SHEET AND SECOND LIGHT-DIFFUSING SHEET BETWEEN THE LIGHT GUIDE PLATE AND THE SECOND LCD PANEL

This application claims priority under 35 U.S.C. §119 to Japanese Patent Application No. 2005-148822 filed May 20, 2005, the entire content of which is hereby incorporated by reference.

BACKGROUND

1. Field of the Invention

The present invention relates to backlight units and, more particularly, to a backlight unit having a light guide plate that illuminates liquid crystal displays provided at both sides thereof.

2. Description of the Background Art

Liquid crystal displays generally use a light source known as a "backlight unit" because the liquid crystal is not self-luminous. Fold type cellular phones, which are now becoming the main trend, need to illuminate two liquid crystal displays provided on the front and back sides thereof. Under these circumstances, various techniques have been proposed for backlight units to illuminate both the front and back liquid crystal displays with a single light guide plate for the purpose of space and cost savings (this type of backlight unit will be hereinafter referred to as a "double-sided backlight unit"). Japanese Patent Application Publication No. 2002-189230, for example, proposes a double-sided backlight unit wherein a single light guide plate is provided between liquid crystal displays spaced from each other, and sheets selectively transmitting either p-polarized light (p-component of light) or s-polarized light (s-component) and reflecting the light that is not transmitted are provided between the light guide plate and the two liquid crystal displays, thereby efficiently transmitting light from the light guide plate to the liquid crystal displays. The proposed technique will be explained below with reference to FIGS. 7A and 7B.

FIG. 7A shows the relationship between a liquid crystal display panel and illuminating light emitted from a light guide plate in a conventional backlight unit. FIG. 7B shows the relationship between a liquid crystal display panel and illuminating light emitted from a light guide plate in the backlight unit of the above-described conventional art.

In the conventional backlight unit, as shown in FIG. 7A, p-component, or p-polarized light 56, and s-component, or s-polarized light 58, are emitted from a light guide plate 10 toward a liquid crystal display panel 25. Because upper-side and lower-side polarizing plates 52, 54 of the liquid crystal display panel 25 is of the absorption type, the s-polarized light 58, for example, is absorbed, and only the p-polarized light 56 illuminates a liquid crystal layer-retaining portion 50, and p-polarized light 60 passes through white-display regions (i.e. activated liquid crystal cells) of the liquid crystal display panel 25.

In FIG. 7B, a reflective polarizing sheet 20 is provided between a liquid crystal display panel 25 and a light guide plate 10. Let us assume, for example, that the reflective polarizing sheet 20 is of the type that reflects s-polarized light but transmits p-polarized light. Of p-polarized light 56 and s-polarized light 58 emitted from the light guide plate 10, only the p-polarized light 56 is transmitted through the reflective polarizing sheet 20. The s-polarized light 58 is reflected by the reflective polarizing sheet 20 to become s-polarized light 62 returning to the light guide plate 10. The p-polarized light 56 transmitted through the reflective polarizing sheet 20 becomes p-polarized light 60 that passes through white-display regions of the liquid crystal display panel 25 in the same way as in FIG. 7A.

The s-polarized light 62 returned to the light guide plate 10 is modified into p-polarized light and s-polarized light in the light guide plate 10 so that p-polarized light and s-polarized light are emitted toward the reflective polarizing sheet 20 as denoted by 64 and 66, respectively.

Thus, if the type of polarized light (p-polarized light or s-polarized light) absorbed by the lower-side polarizing plate 54 of the liquid crystal display panel 25 is the same as type of polarized light that is reflected by the reflective polarizing sheet 20, there is no light absorption by the lower-side polarizing plate 54 of the liquid crystal display panel 25. Consequently, the light utilization efficiency increases to a considerable extent.

In the case of a double-sided backlight unit in which a single light guide plate illuminates first and second liquid crystal displays disposed at both sides thereof, the light utilization efficiency can be increased by setting the type of polarized light (s-polarized light or p-polarized light) absorbed by the polarizing plate of the first liquid crystal display panel to be the same as the type of polarized light reflected by a first reflective polarizing sheet provided between the first liquid crystal display panel and the light guide plate, and setting the type of polarized light absorbed by the polarizing plate of the second liquid crystal display panel to be the same as the type of polarized light reflected by a second reflective polarizing sheet provided between the second liquid crystal display panel and the light guide plate and, at the same time, different from the type of polarized light reflected by the first reflective polarizing sheet.

Such a reflective polarizing sheet is commercially available, for example, as "RDF series" from Sumitomo 3M Ltd.

The foregoing is the fundamental part of the technique disclosed in the above-mentioned application. In the double-sided backlight unit, however, if the two liquid crystal display panels of the liquid crystal display device are different in display area or size from each other, some problems arise.

The first problem is that the use of two reflective polarizing sheets causes an increase in cost. The second problem is brightness unevenness occurring on the one of the two liquid crystal display panels that is larger than the other, as will be explained below.

The problem of brightness unevenness will be explained below by using a liquid crystal display device shown in FIG. 8.

In the liquid crystal display device, a double-sided backlight unit having a light source 12, a light guide plate 10, and reflective polarizing sheets 20 and 21 is held in a housing 40. A liquid crystal display panel 26 having a small display area and a liquid crystal display panel 24 having a large display area are set in respective apertures 41 and 43 formed in the housing 40.

It is herein assumed that the reflective polarizing sheet 20 is of the type that reflects s-polarized light but transmits p-polarized light; the reflective polarizing sheet 21 is of the type that reflects p-polarized light but transmits s-polarized light; the light guide plate-side polarizing plate (not shown) of the liquid crystal display panel 26 is of the type that absorbs s-polarized light; and the light guide plate-side polarizing plate (not shown) of the liquid crystal display panel 24 is of the type that absorbs p-polarized light.

Of p-polarized light 56 and s-polarized light 58 emitted upward from the light guide plate 10, only the p-polarized light 56 is transmitted through the reflective polarizing sheet 20. The s-polarized light 58 is reflected by the reflective polarizing sheet 20 to become s-polarized light 62 returning to the light guide plate 10. The p-polarized light 56 transmitted through the reflective polarizing sheet 20 passes through white-display regions of the liquid crystal display panel 26. Of s-polarized light 57 and p-polarized light 59 emitted downward from the light guide plate 10, only the s-polarized light 57 is transmitted through the reflective polarizing sheet 21. The p-polarized light 59 is reflected by the reflective polarizing sheet 21 to become p-polarized light 63 returning to the light guide plate 10. The s-polarized light 57 transmitted through the reflective polarizing sheet 21 passes through white-display regions of the liquid crystal display panel 24.

P-polarized light 72 that is transmitted through the reflective polarizing sheet 20 and impinges on the inner surface of the housing 40 (where the liquid crystal display panel 26 is not present) is reflected by the housing inner surface to become p-polarized light 80, which is then transmitted through the reflective polarizing sheet 20 to enter the light guide plate 10. The p-polarized light 80 is modified into p-polarized light and s-polarized light in the part of the light guide plate 10 that the p-polarized light 80 entered. Accordingly, s-polarized light 73 and p-polarized light 75 emitted downward from that part of the light guide plate 10 increase in light quantity. Although the p-polarized light 75 is reflected by the reflective polarizing sheet 21, the s-polarized light 73 having an increased light quantity is transmitted through the reflective polarizing sheet 21 and passes through white-display regions of the liquid crystal display panel 24. Accordingly, the part of the liquid crystal display panel 24 that is illuminated by the s-polarized light 73 becomes brighter than the part S of the display panel 24 that is not illuminated by the s-polarized light 73 (i.e. the part facing the liquid crystal display panel 26). As a result, brightness unevenness occurs in the display area of the liquid crystal display panel 24.

The influence of the s-polarized light 73 can be eliminated by disposing a light-diffusing sheet having high diffusing capability between the light guide plate and the liquid crystal display panel of larger display area to resolve the problem of brightness unevenness. By doing so, however, the light utilization efficiency is reduced correspondingly.

BRIEF SUMMARY

Accordingly, an object of the present invention is to provide a double-sided backlight unit free from the above-described problems.

The present invention provides a double-sided backlight unit comprising a single light guide plate provided between a first liquid crystal display panel adapted to pass one of p-component and s-component of light and absorb an other of the p-component and s-component of light and a second liquid crystal display panel adapted to pass the other of p-component and s-component of light and absorb the one of the p-component and s-component of light. The second liquid crystal display panel is positioned opposite to the first liquid crystal display panel and has a larger area than that of the first liquid crystal display panel. The light guide plate is designed to emit light toward both of the first and second liquid crystal display panels. The backlight unit further comprises a light-absorbing sheet disposed between the light guide plate and the first liquid crystal display panel to absorb light impinging thereon. The light-absorbing sheet has a light-permeating or light-transmitting part aligned with the first liquid crystal display panel in a direction from the light guide plate toward the first liquid crystal display panel to transmit light from the light guide plate to the first liquid crystal display panel. The backlight unit furthermore comprises at least one of a first reflective polarizing sheet disposed between the light guide plate and light-absorbing sheet and a second reflective polarizing sheet disposed between the light guide plate and the second liquid crystal display panel. The first reflective polarizing sheet is designed to pass the one of the p-component and s-component of light and reflect the other of the p-component and s-component of light and the second polarizing sheet is designed to pass the other of the p-component and s-component of light and reflect the one of the p-component and s-component of light.

The double-sided backlight unit may comprise at least one of a first light-diffusing sheet disposed between the light guide plate and the light-absorbing sheet and a second light-diffusing sheet disposed between the light guide plate and the second liquid crystal display panel.

The double-sided backlight unit may further comprise at least one of first brightness enhancement film disposed between the light guide plate and the light-absorbing sheet and a second brightness enhancement film disposed between the light guide plate and the second liquid crystal display panel.

Alternatively, the double-sided backlight unit may comprise a brightness enhancement film disposed between the light-absorbing sheet and the first liquid crystal display panel, wherein the brightness enhancement film has a size corresponding to that of the first liquid crystal display plate and is aligned with the first liquid crystal display plate in a direction from the light guide plate toward the first liquid crystal display plate.

The light-permeating or light-transmitting part may be an aperture formed in the light absorbing sheet.

The light-permeating part may comprise a brightness enhancement film.

In one embodiment, the light-diffusing sheet and the first brightness enhancement film are disposed between the light guide plate and the light-absorbing sheet in that order, and, the second brightness enhancement film and the reflective polarizing sheet are disposed between the light guide plate and the second liquid crystal display panel in that order.

In another embodiment, the first brightness enhancement film and the first reflective polarizing sheet are disposed between the light guide plate and the light-absorbing sheet in that order, and the light-diffusing sheet and the second brightness enhancement film are disposed between the light guide plate and the second liquid crystal display panel in that order.

In a further embodiment, the first brightness enhancement film, the first light-diffusing sheet and the first reflective polarizing sheet are disposed between the light guide plate and the light-absorbing sheet in that order, and the second brightness enhancement film, the second light-diffusing sheet and the second reflective polarizing sheet are disposed between the light guide plate and the second liquid crystal display panel in that order.

In a still further embodiment, the first reflective polarizing sheet, the first brightness enhancement film, and the first light-diffusing sheet are disposed between the light guide plate and the light-absorbing sheet in that order, and the second reflective polarizing sheet, the second brightness enhancement film, and the second light-diffusing sheet are disposed between the light guide plate and the second liquid crystal display panel in that order.

In another embodiment, the first light-diffusing sheet and the first brightness enhancement film are disposed between the light guide plate and the light-absorbing sheet in that order, and the second reflective polarizing sheet and the second brightness enhancement film are disposed between the light guide plate and the second liquid crystal display panel in that order.

In a further embodiment, the first light-diffusing sheet and the first brightness enhancement film are disposed between the light guide plate and the light-absorbing sheet in that order, the second reflective polarizing sheet, the second brightness enhancement film, and the second diffusion sheet are disposed between the light guide plate and the second liquid crystal display panel in that order, and the double-sided backlight unit further comprises a third diffusion sheet disposed between the first brightness enhancement sheet and the light-absorbing sheet.

In the embodiment wherein the brightness enhancement film is disposed between the light-absorbing sheet and the first liquid crystal display plate, the first light-diffusing sheet may be disposed between the light guide plate and the light-absorbing sheet, and the second brightness enhancement film and the reflective polarizing sheet are disposed between the light guide plate and the second liquid crystal display panel in that order.

The backlight unit according to the present invention may comprise a housing which has a first wall and a second wall opposed to the first wall and accommodates the first and second brightness enhancement sheets, the first and second light-diffusing sheet, the first and second reflective polarizing sheets and the light-absorbing sheet. The first wall has a first opening into which the first liquid crystal display panel is fitted, and the second wall has a second opening into which the second liquid crystal display panel is fitted.

The present invention will be able to solve the problem of brightness unevenness as discussed above, while improving light utilization efficiency.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

Figure 1A:
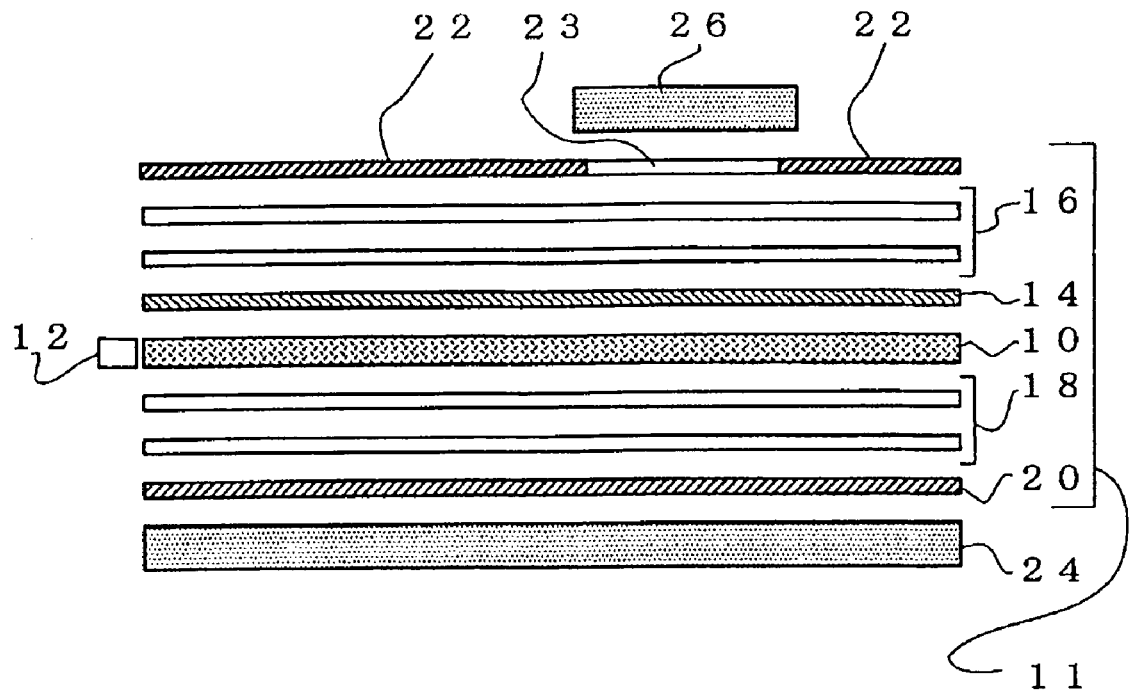
FIG. 1A is a diagram showing a first embodiment of the double-sided backlight unit according to the present invention.
Figure 1B:
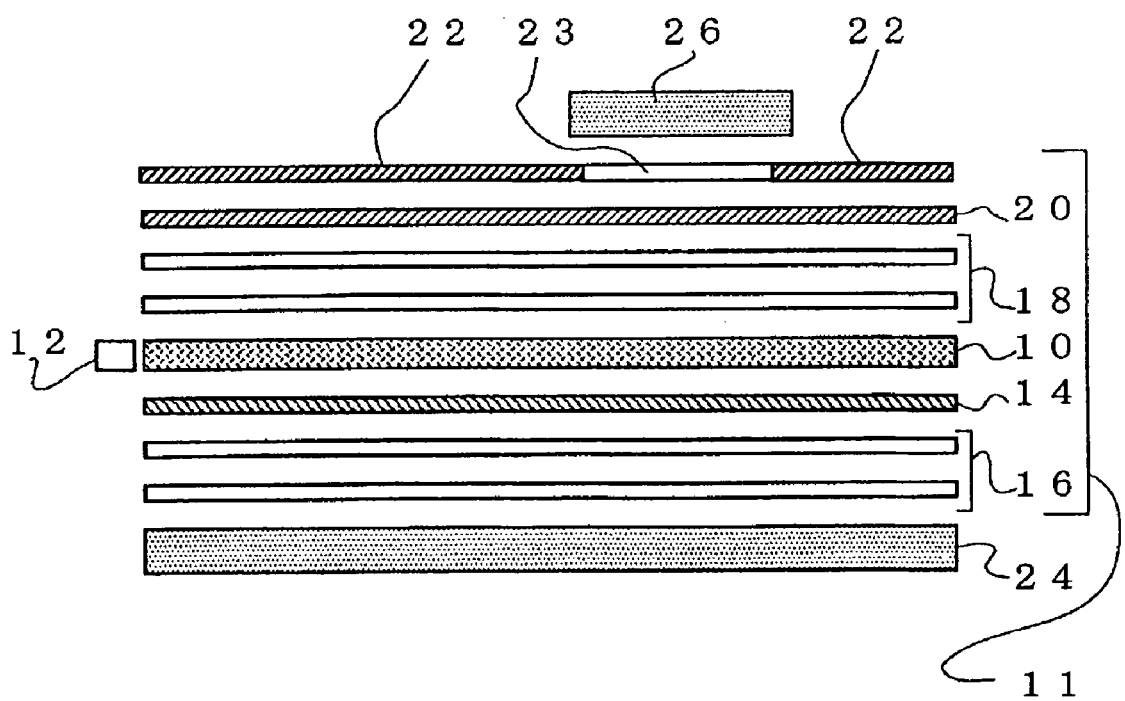
FIG. 1B is a diagram showing a modification of the first embodiment.

Embodiments of the present invention will be described below in detail with reference to the accompanying drawings. FIGS. 1A and 1B show a first embodiment of the double-sided backlight unit according to the present invention.

In FIG. 1A, a light source 12 comprising LEDs, for example, is disposed at one end of a light guide plate 10. Directly below the light guide plate 10, two brightness enhancement films 18 and a reflective polarizing sheet 20 are disposed in the mentioned order. The reflective polarizing sheet 20 faces a liquid crystal display panel 24 having a large display area.

Directly above the light guide plate 10, a light-diffusing sheet 14, two brightness enhancement films 16, and a light-absorbing sheet 22 having an aperture 23 are disposed in the mentioned order. The aperture 23 of the light-absorbing sheet 22 faces a liquid crystal display panel 26 having a small display area.

The aperture 23 of the light-absorbing sheet 22 has an area substantially equal to that of the display part of the liquid crystal display panel 26.

The brightness enhancement films 18 and 16 are films for condensing light from the light guide plate 10 and directing the light in directions away from the light guide plate towards the liquid crystal display panels, respectively. Specifically, each film has a plurality of linear microprisms formed on one side thereof parallel and adjacent to each other. The two brightness enhancement films 18 are set so that the sides thereof with the prisms are directed toward the liquid crystal display 24 and the prisms thereof extend in orthogonal directions to each other. The same may be explained for the two brightness enhancement films 16. Such brightness enhancement films are commercially available, for example, as BEF series, RBEF series, and Wave Film series from Sumitomo 3M Ltd.

In this embodiment, the light source 12, the light guide plate 10, the brightness enhancement films 18, the reflective polarizing sheet 20, the light-diffusing sheet 14, the brightness enhancement films 16, and the light-absorbing sheet 22 form, in combination, a double-sided backlight unit.

Light emitted from the light source 12 is guided into the light guide plate 10 and emitted upward and downward from the light guide plate 10. The light emitted upward from the light guide plate 10 is uniformly diffused by the light-diffusing sheet 14 before impinging on the two brightness enhancement films 16. The light passes through the two brightness enhancement films 16 while being forced in a direction substantially perpendicular to the plane on which the liquid crystal display panel 26 lays. The part of the light that passes through the aperture 23 of the light-absorbing sheet 22 illuminates the liquid crystal display panel 26. The rest of the light is absorbed by the light-absorbing sheet 22. That is, there is no substantial reflected light such as that shown by reference numeral 80 in FIG. 8. Therefore, there is no brightness unevenness on the liquid crystal display panel 24. Accordingly, the backlight unit according to this embodiment need not make the light-diffusing sheet 14 have high diffusing capability to resolve the brightness unevenness, which would otherwise reduce the light utilization efficiency, as has been stated in the section entitled "Description of the Background Art".

Figure 7A:
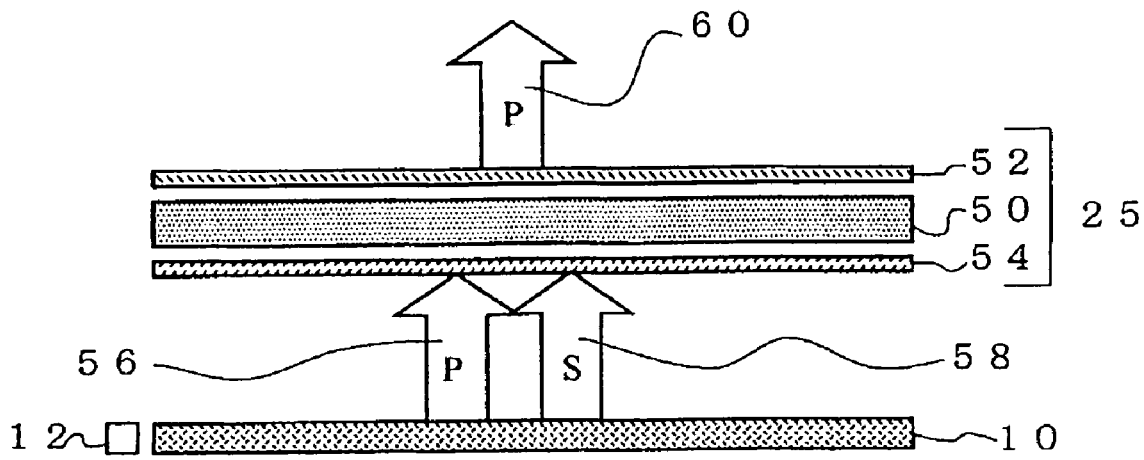
FIG. 7A is a diagram explaining a backlight unit using no reflective polarizing sheet.
Figure 7B:
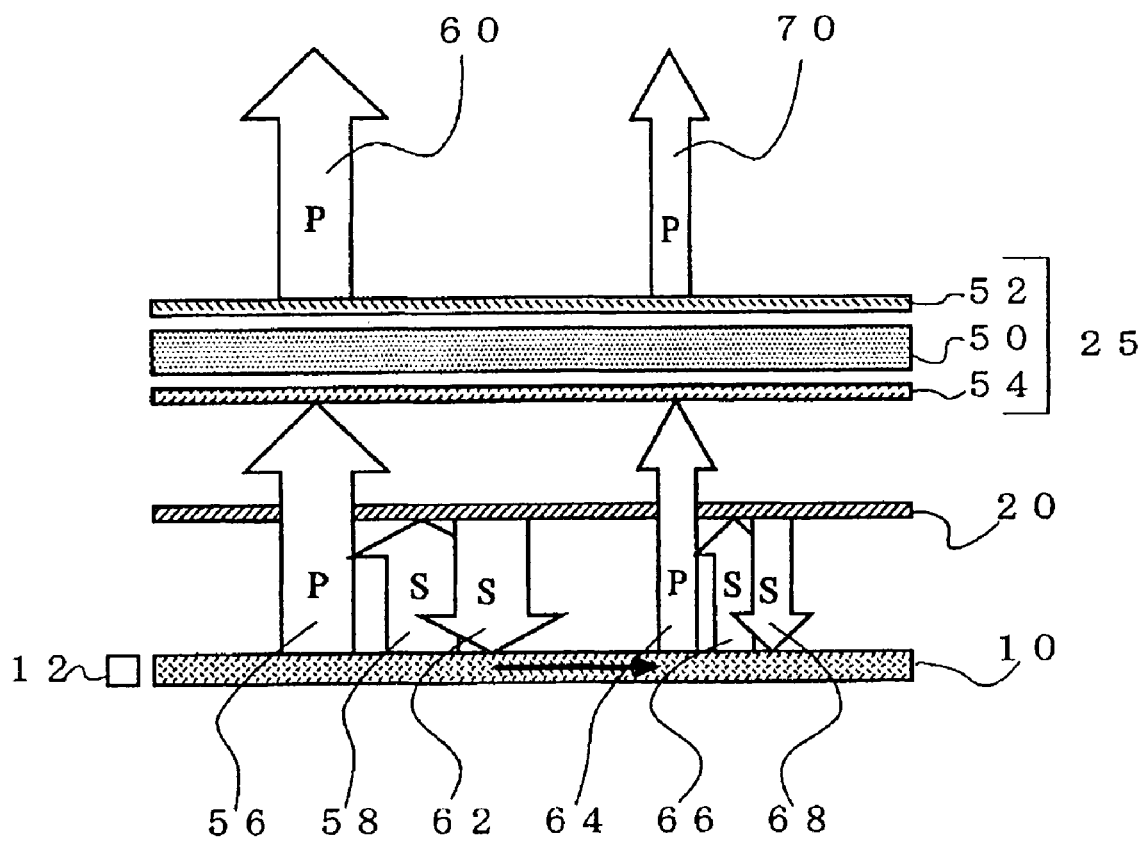
FIG. 7B is a diagram explaining a backlight unit using a reflective polarizing sheet.

The light emitted downward from the light guide plate 10 is formed into light substantially perpendicular to the liquid crystal display panel 24 by the two brightness enhancement films 18. The light impinges on the reflective polarizing sheet 20. Of the incident light to the reflective sheet 20, one of p-polarized light and s-polarized light is transmitted through the reflective polarizing sheet 20, and the other of s-polarized light and p-polarized light is reflected by the reflective polarizing sheet 20 to return to the light guide plate 10 through the brightness enhancement films 18, as has been stated above in connection with FIG. 7B.

If the type of polarized light (p-polarized light or s-polarized light) absorbed by the light guide plate-side polarizing plate (not shown) of the liquid crystal display panel 24 is the same as the type of polarized light that is reflected by the reflective polarizing sheet 20, there is no light absorption by the light guide plate-side polarizing plate of the liquid crystal display panel 24. Accordingly, almost all light transmitted through the reflective polarizing sheet 20 contributes to the illumination of the liquid crystal display panel 24. Thus, the light utilization efficiency increases to a considerable extent.

The light-absorbing sheet 22 may be a non-reflective black sheet, for example.

Figure 8:
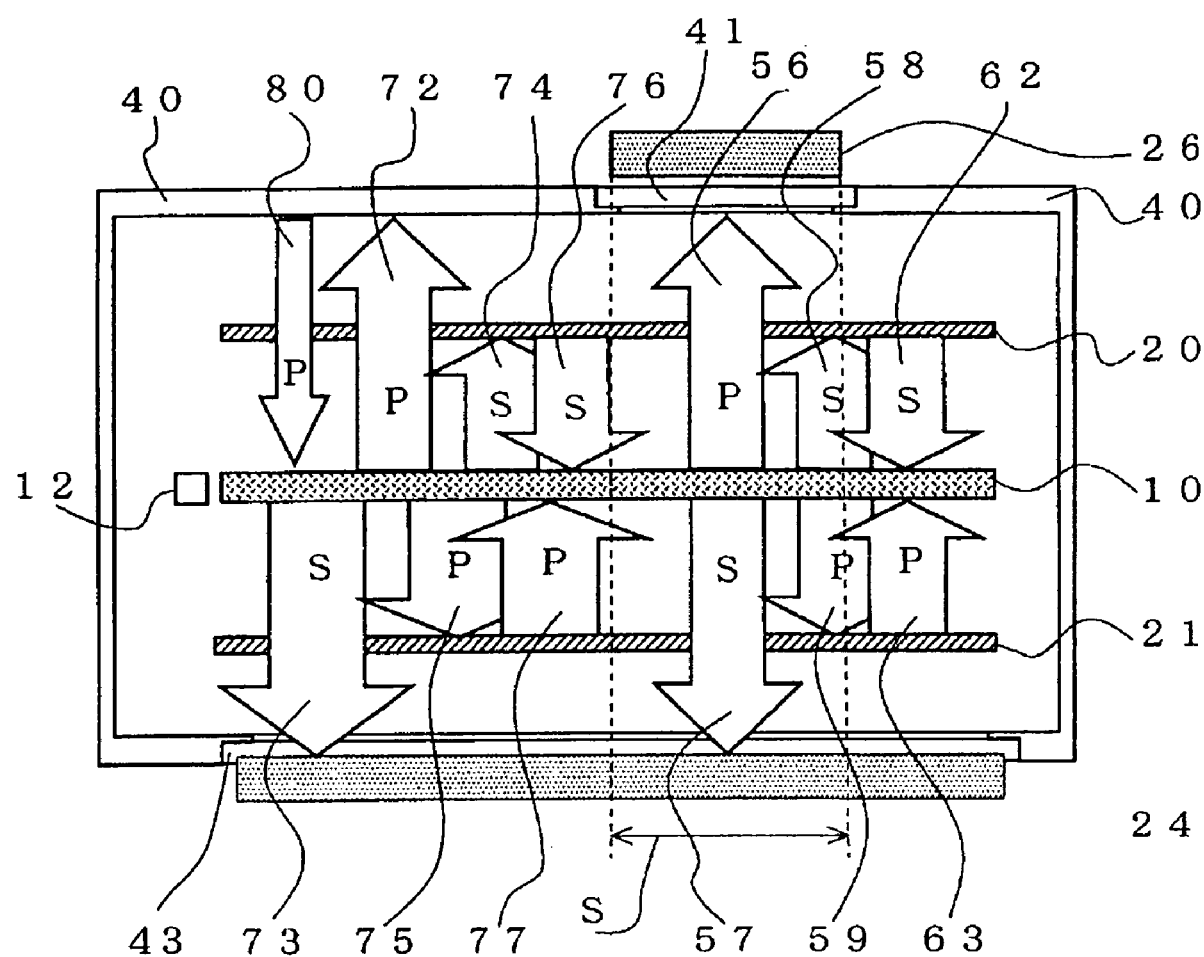
FIG. 8 is a diagram explaining brightness unevenness occurring in a conventional double-sided backlight unit using reflective polarizing sheets.

When a member such as the housing 40 in FIG. 8 is used, a black coating layer may be formed on the inner side of the member to serve as the light-absorbing sheet 22.

It is also possible to use a semi-reflective sheet or a half-silvered mirror as is needed.

In FIG. 1A, the light-diffusing sheet 14 is disposed at the side of the backlight unit closer to the liquid crystal display panel 26 having a small display area, and the reflective polarizing sheet 20 is disposed at the side of the backlight unit closer to the liquid crystal display panel 24 having a large display area. It should be noted, however, that the positional relationship between the light-diffusing sheet 14 and the reflective polarizing sheet 20 can be reversed as shown in FIG. 1B. That is, in the backlight unit shown in FIG. 1B, the two brightness enhancement films 18, the reflective polarizing sheet 20, and the light-absorbing sheet 22 are disposed in the mentioned order directly above the light guide plate 10, and the light-diffusing sheet 14 and the two brightness enhancement films 16 are disposed in the mentioned order directly below the light guide plate 10.

In the reflective polarizing sheet side of the backlight unit, light transmitted through the reflective polarizing sheet directly impinges on the liquid crystal display panel, while in the opposite side the light directed toward the reflective polarizing sheet is passed through the light-diffusing sheet before impinging on the liquid crystal display panel. Consequently, the liquid crystal display panel at the side where the reflective polarizing sheet is provided tends to become brighter than at the opposite side. For this reason, it is preferable to dispose the reflective polarizing sheet at the side where a liquid crystal display panel requiring higher brightness is disposed.

The double-sided backlight unit according to this embodiment allows a cost reduction because it uses only one reflective polarizing sheet, while resolving the problem of brightness unevenness by the use of a light-absorbing sheet.

Figure 2A:
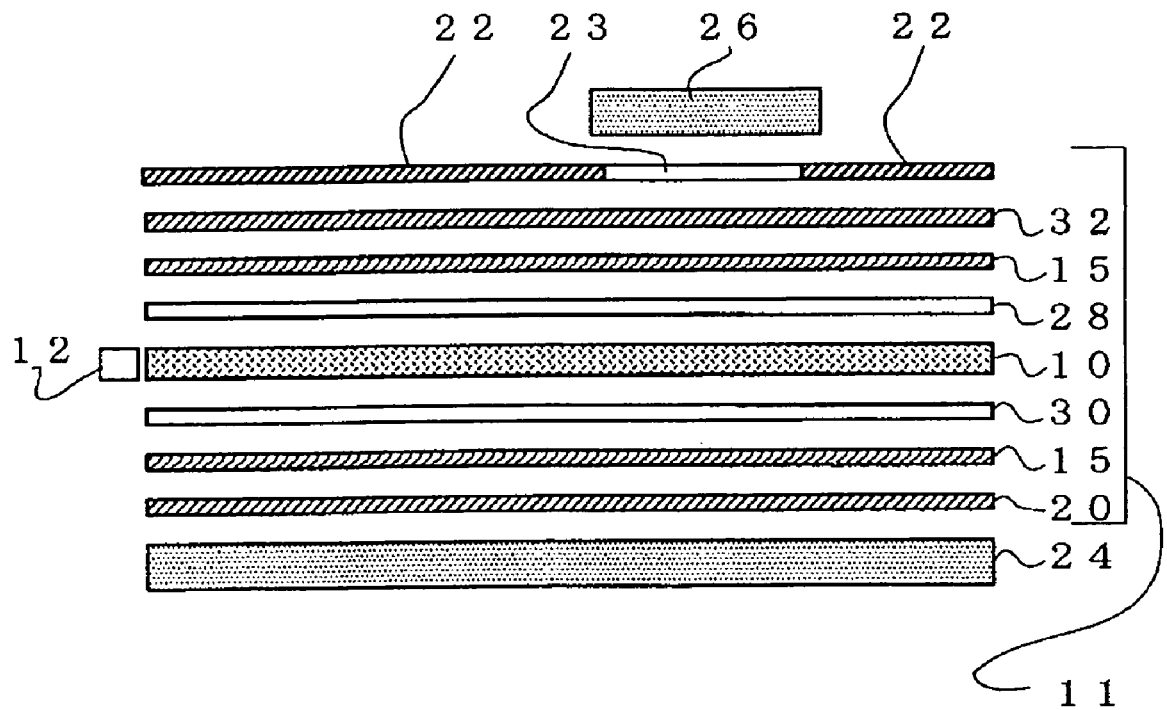
FIG. 2A is a diagram showing a second embodiment of the double-sided backlight unit according to the present invention.
Figure 2B:
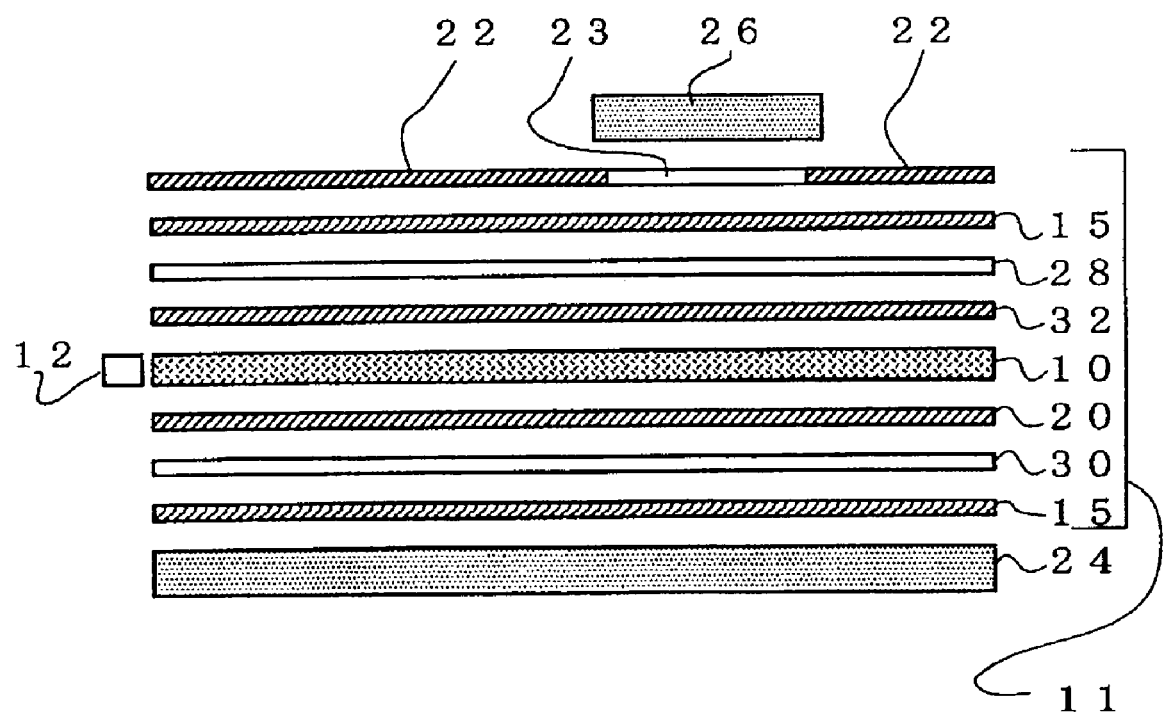
FIG. 2B is a diagram showing a modification of the second embodiment.

FIGS. 2A and 2B show a second embodiment of the double-sided backlight unit according to the present invention.

In FIG. 2A, a light source 12 comprising LEDs, for example, is disposed at one end of a light guide plate 10. Directly below the light guide plate 10, a single brightness enhancement film 30, a light-diffusing sheet 15, which is used as is needed, and a reflective polarizing sheet 20 are disposed in the mentioned order. The reflective polarizing sheet 20 faces a liquid crystal display panel 24 having a large display area.

Directly above the light guide plate 10, a single brightness enhancement film 28, a light-diffusing sheet 15, which is used as is needed, a reflective polarizing sheet 32, and a light-absorbing sheet 22 having an aperture 23 are disposed in the mentioned order. A liquid crystal display panel 26 having a small display area faces the aperture 23 of the light-absorbing sheet 22.

The aperture 23 of the light-absorbing sheet 22 has an area substantially equal to that of the display part of the liquid crystal display panel 26 as in the case of FIGS. 1A and 1B.

In this embodiment, the light source 12, the light guide plate 10, the brightness enhancement films 28 and 30, the reflective polarizing sheets 20 and 32, the two light-diffusing sheets 15, and the light-absorbing sheet 22 form, in combination, a double-sided backlight unit.

The brightness enhancement films used in this embodiment are higher in brightness enhancing power than those used in the first embodiment and commercially available, for example, as "DIAART Y-Type prism sheets" from Mitsubishi Rayon Co., Ltd. Specifically, each of the brightness enhancement film has a plurality of linear microprisms formed on one side thereof parallel and adjacent to each other and is set so that the side with the microprisms faces the light guide plate, whereby the majority of the light entering thereinto is directed toward the liquid crystal display panel. Although some of the incident light to the brightness enhancement film is returned to the light guide plate, the amount thereof is small as compared with that in the first embodiment in which the brightness enhancement film is set so that the side with the microprisms faces away from the light guide plate.

Light emitted from the light source 12 is guided into the light guide plate 10 and emitted upward and downward from the light guide plate 10.

The light emitted downward from the light guide plate 10 is formed into light substantially perpendicular to the liquid crystal display panel 24 by the brightness enhancement film 30. The light-diffusing sheet 15, which is provided according to display conditions, uniformly diffuses the light passed through the brightness enhancement film 30. The light then impinges on the reflective polarizing sheet 20. As has been stated above in connection with FIG. 7B, only one of p- and s-polarized light components is transmitted through the reflective polarizing sheet 20. The other polarized light component is reflected by the reflective polarizing sheet 20 and returned to the light guide plate 10 through the light-diffusing sheet 15 and the brightness enhancement film 30. The returned light is modified in the light guide plate 10 and emitted therefrom again.

If the type of polarized light absorbed by the light guide plate-side polarizing plate (not shown) of the liquid crystal display panel 24 is the same as the type of polarized light that is reflected by the reflective polarizing sheet 20, there is no light absorption by the light guide plate-side polarizing plate of the liquid crystal display panel 24. Accordingly, almost all light transmitted through the reflective polarizing sheet 20 contributes to the illumination of the liquid crystal display panel 24. Thus, the light utilization efficiency increases to a considerable extent.

The light emitted upward from the light guide plate 10 is transmitted through or reflected by the reflective polarizing sheet 32 in the same way as the above. Of the light transmitted through the reflective polarizing sheet 32, light passing through the aperture 23 of the light-absorbing sheet 22 illuminates the liquid crystal display panel 26, and the light other than the light passing through the aperture is absorbed by the light-absorbing sheet 22. That is, there is no reflected light such as that shown by reference numeral 80 in FIG. 8. Therefore, there is no brightness unevenness on the liquid crystal display panel 24.

Accordingly, the light-diffusing sheet 14 need not have high diffusion capacity to resolve the brightness unevenness, which would otherwise reduce the light utilization efficiency.

It should be noted that this embodiment uses brightness enhancement films of high brightness enhancing power. In this case, it is desirable to dispose a brightness enhancement film and a light-diffusing sheet in order from the light guide plate toward the liquid crystal display panel. In the case of ordinary brightness enhancement films such as those used in the first embodiment, however, it is desirable to dispose a light-diffusing sheet and two brightness enhancement films in order from the light guide plate toward the liquid crystal display panel.

In this embodiment, the sheet group consisting essentially of a brightness enhancement film of high brightness enhancing power and a light-diffusing sheet disposed in order from the light guide plate toward the liquid crystal display panel can be replaced with the sheet group consisting essentially of a light-diffusing sheet and two commonly used brightness enhancement films disposed in order from the light guide plate toward the liquid crystal display panel.

In the embodiment shown in FIG. 2A, a light-diffusing sheet 15 is disposed at each side of the light guide plate 10. It should be noted, however, that a light-diffusing sheet 15 may be disposed only at least either between the light guide plate 10 and the reflective polarizing sheet 20 or between the light guide plate 10 and the reflective polarizing sheet 32.

Further, in the embodiment shown in FIG. 2A, a brightness enhancement film is disposed at each side of the light guide plate 10. The arrangement, however, may be such that a brightness enhancement film is disposed only at one side of the light guide plate 10, i.e. between the light guide plate 10 and the reflective polarizing sheet 20 or 32.

FIG. 2B illustrates a modification of the embodiment shown in FIG. 2A. Directly below a light guide plate 10, a reflective polarizing sheet 20, a single brightness enhancement film 30, and a light-diffusing sheet 15, which is used as needed, are disposed in the mentioned order. The light-diffusing sheet 15 faces a liquid crystal display panel 24 having a large display area.

Directly above the light guide plate 10, a reflective polarizing sheet 32, a single brightness enhancement film 28, a light-diffusing sheet 15, which is used according to need, and a light-absorbing sheet 22 having an aperture 23 are disposed in the mentioned order. The aperture 23 of the light-absorbing sheet 22 faces a liquid crystal display panel 26 having a small display area.

Thus, the positional relationship between the reflective polarizing sheet 20 (32) and the sheet group consisting essentially of the brightness enhancement film 30 (28) and the light-diffusing sheet 15 can be reversed.

In the modification shown in FIG. 2B, a brightness enhancement film is disposed at each side of the light guide plate 10. The arrangement, however, may be such that a brightness enhancement film is disposed only at one side of the light guide plate 10, i.e. either between the reflective polarizing sheet 20 and the liquid crystal display panel 24 or between the reflective polarizing sheet 32 and the liquid crystal display panel 26.

Thus, disposing reflective polarizing sheets at both sides of the light guide plate 10 enables the light utilization efficiency to be further increased. Moreover, provision of the light-absorbing sheet 22 eliminates the problem of brightness unevenness.

It should be noted that the light-diffusing sheet 15 in the double-sided backlight units shown in FIGS. 2A and 2B may be omitted from either side or both sides of the light guide plate 10.

Figure 3:
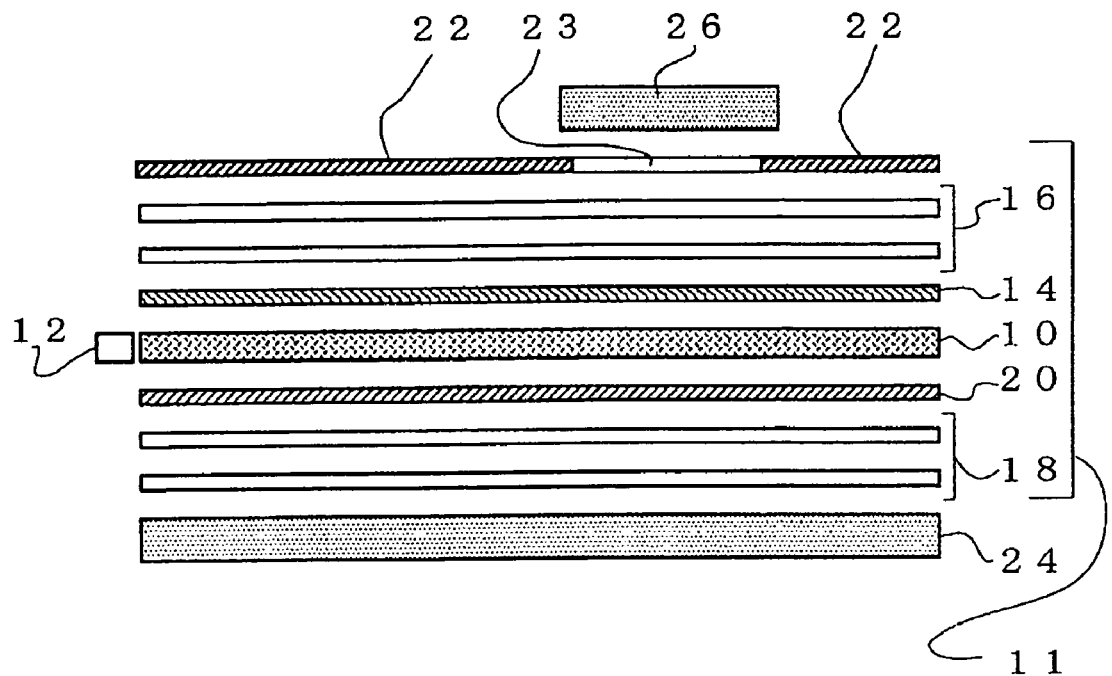
FIG. 3 is a diagram showing a third embodiment of the double-sided backlight unit according to the present invention.

FIG. 3 shows a third embodiment of the double-sided backlight unit according to the present invention. The third embodiment is characterized by reversing the positional relationship between the reflective polarizing sheet and the brightness enhancement films in the first embodiment shown in FIGS. 1A and 1B.

With the arrangement of the third embodiment, light emitted downward from the light guide plate 10 impinges on the reflective polarizing sheet 20. Only one of p- and s-polarized light components is transmitted through the reflective polarizing sheet 20, and the other polarized light component is reflected by the reflective polarizing sheet 20 to return to the light guide plate 10, as has been stated above in connection with FIG. 7B. The returned light is modified in the light guide plate 10 and emitted therefrom again. The p-polarized light or s-polarized light transmitted through the reflective polarizing sheet 20 is formed into light directed substantially perpendicular to a liquid crystal display panel 24 by the two brightness enhancement films 18 and illuminates the liquid crystal display panel 24. If the type of polarized light absorbed by the light guide plate-side polarizing plate (not shown) of the liquid crystal display panel 24 is the same as the type of polarized light that is reflected by the reflective polarizing sheet 20, there is no light absorption by the light guide plate-side polarizing plate of the liquid crystal display panel 24. Accordingly, almost all light transmitted through the reflective polarizing sheet 20 contributes to the illumination of the liquid crystal display panel 24. Thus, the light utilization efficiency increases to a considerable extent.

Thus, it is possible to obtain substantially the same advantageous effects as those in the first embodiment shown in FIGS. 1A and 1B even if the positional relationship between the reflective polarizing sheet and the brightness enhancement films is reversed.

Although in this embodiment the light-diffusing sheet 14 is disposed at the side of the backlight unit closer to the liquid crystal display panel 26 having a small display area and the reflective polarizing sheet 20 is disposed at the side of the backlight unit closer to the liquid crystal display panel 24 having a large display area, the positional relationship between the light-diffusing sheet 14 and the reflective polarizing sheet 20 can be reversed without causing a problem, as in the case of the first embodiment.

Figure 4:
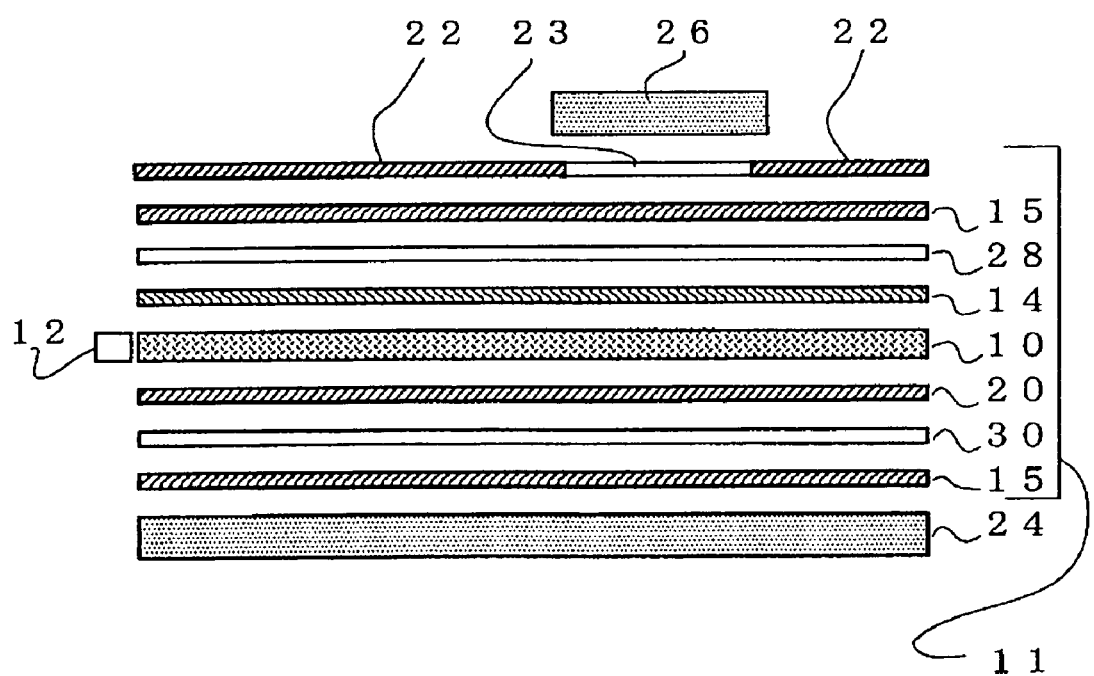
FIG. 4 is a diagram showing a fourth embodiment of the double-sided backlight unit according to the present invention.

FIG. 4 shows a fourth embodiment of the double-sided backlight unit according to the present invention, in which brightness enhancement films of high brightness enhancing power are used in the same way as in the second embodiment. The fourth embodiment differs from the first to third embodiments in the positional relationship between a reflective polarizing sheet, a brightness enhancement film, and a light-diffusing sheet.

In FIG. 4, a reflective polarizing sheet 20 and a single brightness enhancement film 30 are disposed in the mentioned order directly below a light guide plate 10. Directly above the light guide plate 10, a light-diffusing sheet 14 and a single brightness enhancement film 28 are disposed in the mentioned order. In addition, light-diffusing sheets 15, which are used as needed, are disposed respectively between the brightness enhancement film 30 and the liquid crystal display panel 24 and between the brightness enhancement film 28 and the liquid crystal display panel 26. A light-absorbing sheet 22 having an aperture 23 is disposed so that the aperture 23 faces the liquid crystal display panel 26 having a small display area as illustrated in the figure.

It should be noted that the light-diffusing sheet 15 in the embodiment shown in FIG. 4 may be omitted from either side or both sides of the light guide plate 10 as in the case of FIGS. 2A and 2B. Whether to provide the light-diffusing sheet 15 at each or either side of the light guide plate 10 or to omit it may be selected by taking into account the brightness unevenness and the brightness of the liquid crystal display panel.

Thus, it is possible to obtain substantially the same advantageous effects as those in the first to third embodiments even if the positional relationship between the various sheets is changed.

Figure 5:
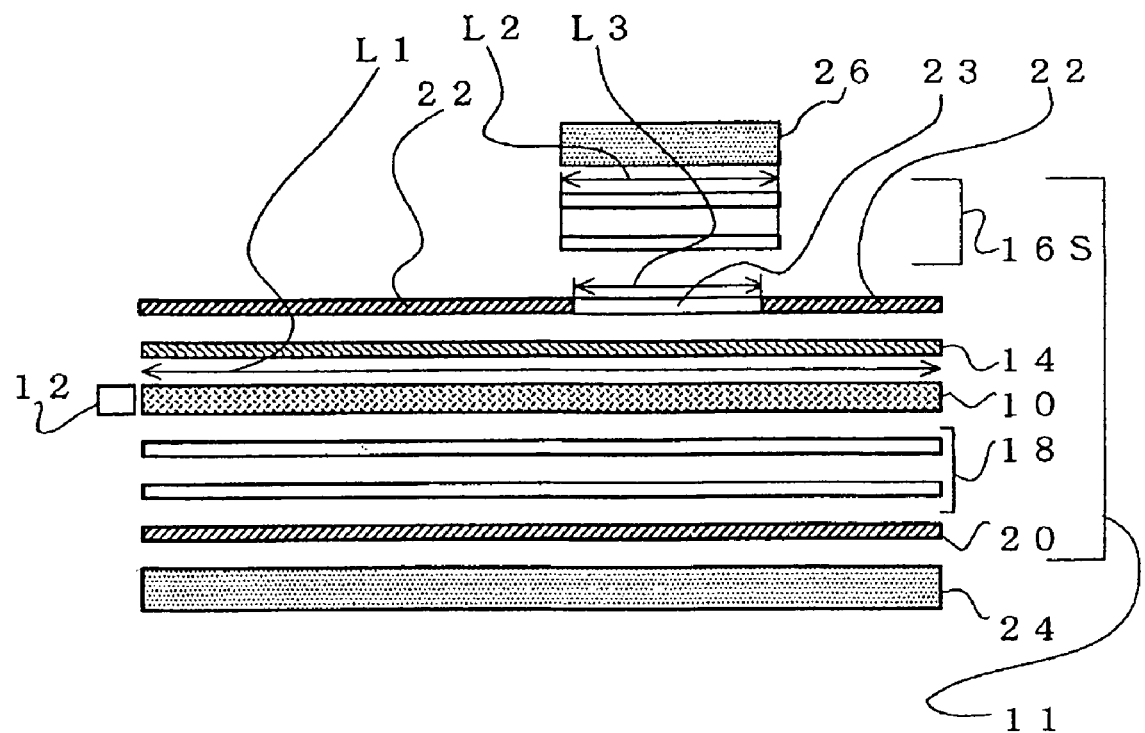
FIG. 5 is a diagram showing a fifth embodiment of the double-sided backlight unit according to the present invention.

FIG. 5 shows a fifth embodiment of the present invention, which is a modification of the first embodiment shown in FIG. 1A.

The backlight unit according to the fifth embodiment has substantially the same arrangement as that of the first embodiment shown in FIG. 1A. In the fifth embodiment, however, a brightness enhancement film 16S for the liquid crystal display panel 26 having a small display area is provided between the liquid crystal display panel 26 and the aperture 23 of the light-absorbing sheet 22 with the brightness enhancement film 16S being aligned with the liquid crystal display panel 26 and the aperture 23. The brightness enhancement film 16S has substantially the same size L2 as that of the liquid crystal display panel 26, which is slightly larger than the size L3 of the aperture 23. By the above arrangement, the peripheral edge of the brightness enhancement film 16S is positioned laterally outside the aperture 23 so that some light that may leak from the peripheral edge of the brightness enhancement film 16S is prevented from directly entering into the aperture 23 to affect the uniformity in brightness of the whole liquid crystal display panel 24. It is preferable that the light absorption ratio (absorbance) of the light-absorbing sheet 22 is adjusted so as to absorb the light leaking from the peripheral edge of the brightness enhancement film 16S which may otherwise enter the aperture 23.

This embodiment allows a cost reduction owing to the size reduction of the brightness enhancement film. The structure of this embodiment is also applicable to the foregoing embodiments.

It should be noted that the downsized brightness enhancement film 16S can be disposed between the light-diffusing sheet 14 and the light-absorbing sheet 22. If such an arrangement is adopted, it is preferable to increase the light-diffusing power of the light-diffusing sheet 14 so that light leaking from the peripheral edge of the brightness enhancement film 16S will not affect the uniformity in brightness of the whole liquid crystal display panel 24.

Furthermore, the brightness enhancement film may be arranged to be fitted in the aperture 23 of the light-absorbing sheet 2.

Figure 6:
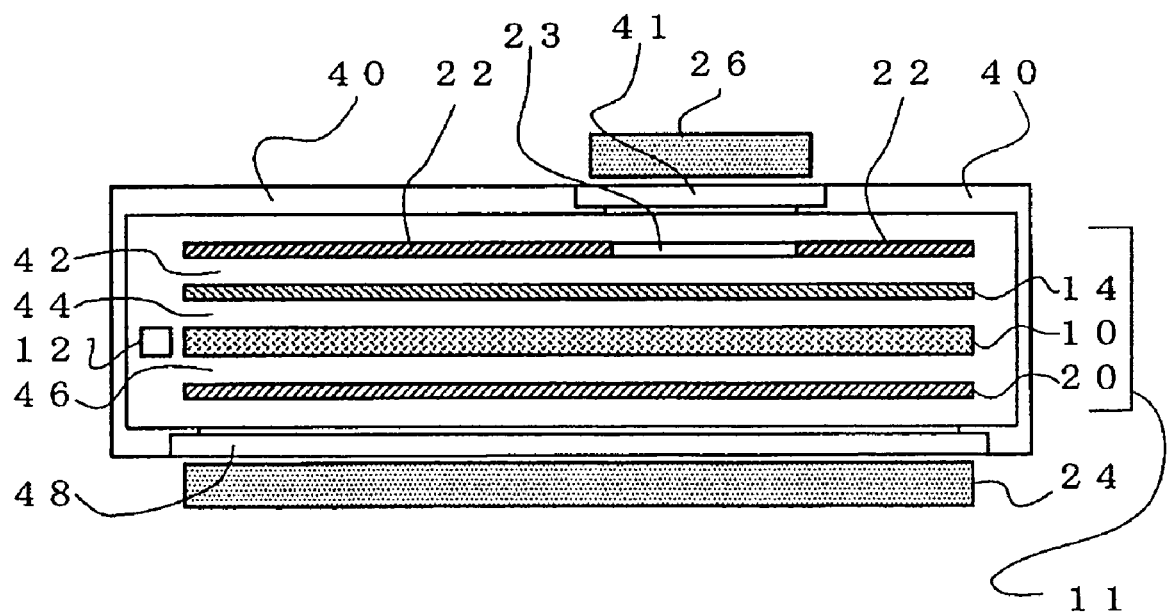
FIG. 6 is a diagram showing a sixth embodiment of the double-sided backlight unit according to the present invention.

FIG. 6 shows a sixth embodiment of the present invention, in which a double-sided backlight unit 11 is accommodated in a housing 40.

The backlight unit 11 has a light guide plate 10, a light source 12, a light-diffusing sheet 14, a reflective polarizing sheet 20, and a light-absorbing sheet 22. A liquid crystal display panel 26 is attached to an aperture 41 provided in the housing 40 at a position corresponding to an aperture 23 of the light-absorbing sheet 22 by using double-sided adhesive tape or the like. Similarly, a liquid crystal display panel 24 is attached to an aperture 48 provided in the housing 40 by using double-coated adhesive tape or the like. A black coating layer may be formed on the inner surface of the housing 40 to substitute for the light-absorbing sheet 22.

The structure of this embodiment facilitates incorporation of the backlight unit into a device such as a cellular phone.

It should be noted that an optical sheet, e.g. a brightness enhancement film or a light-diffusing sheet, may be disposed, as needed, at any of the following positions: between the light-absorbing sheet 22 and the light-diffusing sheet 14; between the light-diffusing sheet 14 and the light guide plate 10; between the light guide plate 10 and the reflective polarizing sheet 20; and between the reflective polarizing sheet 20 and the liquid crystal display panel 24.

The respective positions of the reflective polarizing sheet 20 and the light-diffusing sheet 14 relative to the light guide plate 10 can be changed with respect to each other.

As described above, according to the present invention, the uniformity in brightness of a whole liquid crystal display can be maintained by using a light-absorbing sheet, while the light utilization efficiency is improved by using a reflective polarizing sheet.

It should be noted that the present invention is not necessarily limited to the foregoing embodiments but can be modified in a variety of ways without departing from the gist of the present invention.

The invention claimed is:

1. A double-sided backlight unit comprising:
    a single light guide plate provided between a first liquid crystal display panel adapted to pass one of p-component and s-component of light and a second liquid crystal display panel adapted to pass the other of p-component and s-component of light, the second liquid crystal display panel being positioned opposite to the first liquid crystal display panel and having a larger area than that of the first liquid crystal display panel, the light guide plate being designed to emit light toward both of the first and second liquid crystal display panels;
    a light-absorbing sheet disposed between the light guide plate and the first liquid crystal display panel to absorb light impinging thereon, the light-absorbing sheet having a light-permeating part aligned with the first liquid crystal display panel in a direction from the light guide plate toward the first liquid crystal display panel to transmit light from the light guide plate to the first liquid crystal display panel;
    at least one of a first reflective polarizing sheet disposed between the light guide plate and light-absorbing sheet and a second reflective polarizing sheet disposed between the light guide plate and the second liquid crystal display panel, the first reflective polarizing sheet being designed to pass the one of the p-component and s-component of light and reflect the other of the p-component and s-component of light, the second polarizing sheet being designed to pass the other of the p-component and s-component of light and reflect the one of the p-component and s-component of light; and,
    at least one of a first light-diffusing sheet disposed between the light guide plate and the light-absorbing sheet and a second light-diffusing sheet disposed between the light guide plate and the second liquid crystal display panel.

2. A double-sided backlight unit according to claim 1, further comprising:
    at least one of first brightness enhancement film disposed between the light guide plate and the light-absorbing sheet and a second brightness enhancement film disposed between the light guide plate and the second liquid crystal display panel.

3. A double-sided backlight unit according to claim 1, further comprising:
a brightness enhancement film disposed between the light-absorbing sheet and the first liquid crystal display panel, wherein the brightness enhancement film has a size corresponding to that of the first liquid crystal display plate and is aligned with the first liquid crystal display plate in a direction from the light guide plate toward the first liquid crystal display plate.

4. A double-sided backlight unit according to claim 1, wherein the light-permeating part is an aperture formed in the light absorbing sheet.

5. A double-sided back light unit according to claim 1, wherein the light-permeating part comprises a brightness enhancement film.

6. A double-sided backlight unit according to claim 2, wherein
the first light-diffusing sheet and the first brightness enhancement film are disposed between the light guide plate and the light-absorbing sheet in that order; and,
the second brightness enhancement film and the second reflective polarizing sheet are disposed between the light guide plate and the second liquid crystal display panel in that order.

7. A double-sided backlight unit according to claim 2, wherein
the first brightness enhancement film and the first reflective polarizing sheet are disposed between the light guide plate and the light-absorbing sheet in that order; and,
the second light-diffusing sheet and the second brightness enhancement film are disposed between the light guide plate and the second liquid crystal display panel in that order.

8. A double-sided backlight unit according to claim 2, wherein
the first brightness enhancement film, the first light-diffusing sheet and the first reflective polarizing sheet are disposed between the light guide plate and the light-absorbing sheet in that order; and,
the second brightness enhancement film, the second light-diffusing sheet and the second reflective polarizing sheet are disposed between the light guide plate and the second liquid crystal display panel in that order.

9. A double-sided backlight unit according to claim 2, wherein
the first reflective polarizing sheet, the first brightness enhancement film, and the first light-diffusing sheet are disposed between the light guide plate and the light-absorbing sheet in that order; and,
the second reflective polarizing sheet, the second brightness enhancement film, and the second light-diffusing sheet are disposed between the light guide plate and the second liquid crystal display panel in that order.

10. A double-sided backlight unit according to claim 2, wherein
the first light-diffusing sheet and the first brightness enhancement film are disposed between the light guide plate and the light-absorbing sheet in that order; and,
the second reflective polarizing sheet and the second brightness enhancement film are disposed between the light guide plate and the second liquid crystal display panel in that order.

11. A double-sided backlight unit according to claim 2, wherein
the first light-diffusing sheet and the first brightness enhancement film are disposed between the light guide plate and the light-absorbing sheet in that order;
the second reflective polarizing sheet, the second brightness enhancement film, and the second diffusion sheet are disposed between the light guide plate and the second liquid crystal display panel in that order; and,
the double-sided backlight unit further comprises
a third diffusion sheet disposed between the first brightness enhancement sheet and the light-absorbing sheet.

12. A double-sided backlight unit according to claim 3, wherein
the first light-diffusing sheet is disposed between the light guide plate and the light-absorbing sheet; and,
the second brightness enhancement film and the second reflective polarizing sheet are disposed between the light guide plate and the second liquid crystal display panel in that order.

13. A double-sided backlight unit according to claim 2, further comprising a housing which has a first wall and a second wall opposed to the first wall and accommodates the first and second brightness enhancement sheets, the first and second light-diffusing sheet, the first and second reflective polarizing sheets and the light-absorbing sheet wherein
the first wall has a first opening into which the first liquid crystal display panel is fitted; and,
the second wall has a second opening into which the second liquid crystal display panel is fitted.

* * * * *